US008735826B2

(12) United States Patent
Lee et al.

(10) Patent No.: US 8,735,826 B2
(45) Date of Patent: May 27, 2014

(54) HUMAN INFRARED RECIPIENT PROCESSOR

(75) Inventors: Tasi-Jing Lee, Dongguan (CN); Ming-Yun Chen, Dongguan (CN)

(73) Assignee: Dongguan Ju Yang Electronics Limited, Dong Guan (CN)

( * ) Notice: Subject to any disclaimer, the term of this patent is extended or adjusted under 35 U.S.C. 154(b) by 388 days.

(21) Appl. No.: 12/973,942

(22) Filed: Dec. 21, 2010

(65) Prior Publication Data
US 2012/0153150 A1 Jun. 21, 2012

(51) Int. Cl.
*G08B 13/19* (2006.01)
(52) U.S. Cl.
CPC ..................................... *G08B 13/19* (2013.01)
USPC ......................................................... 250/342
(58) Field of Classification Search
CPC ......... G08B 13/19; G01J 5/0025; G01J 5/026
USPC ......................................................... 250/342
See application file for complete search history.

(56) References Cited

U.S. PATENT DOCUMENTS

| 2007/0285053 | A1* | 12/2007 | Noguchi et al. | 320/114 |
| 2011/0037757 | A1* | 2/2011 | Song et al. | 345/213 |
| 2012/0094240 | A1* | 4/2012 | Rubinshtein | 431/28 |

* cited by examiner

*Primary Examiner* — Constantine Hannaher
(74) *Attorney, Agent, or Firm* — WPAT, PC; Justin King

(57) ABSTRACT

An IP processing technology is disclosed, and more particularly to a human infrared recipient processor, comprising: an amplifying circuit, a switch control circuit for output of switching signals, a PIR for obtaining analogue human IR signals, a PHOT for obtaining brightness signals, a main controller IC1 used for A/D conversion and digital filtering of analogue human IR signals and logical control/output of high-/low-level signals by the brightness and switching signals, as well as an external output circuit for controlling the working states depending on high-/low-level signals; wherein the human infrared recipient processor of the present invention features simple construction, higher SNR, stability, and sensitivity as well as stronger logical functions.

13 Claims, 2 Drawing Sheets

HUMAN INFRARED RECIPIENT PROCESSOR

BACKGROUND OF INVENTION

1. Field of the Invention

The present invention relates generally to IR processing technology, and more particularly to a human infrared recipient processor.

2. Description of Related Art

The human infrared recipient processor, represented by a common IR sensing control technology, is widely applied to lightings, alarm systems and temperature measurement, etc. It generally comprises: PIR (Passive Infrared Radiation), operational amplifier, controller and output circuit.

According to the operating principle of PIR, its IR sensing source is a thermoelectric substance, which may, in the case of change of the human body's received infrared intensity, lose the charge balance and start to release current, thus obtaining IR signals sent by the human body. Moreover, the operational amplifier often employs LM324. For example, when the human infrared recipient processor is applied to LED sensor light, IR signals sensed by PIR are amplified and output as analog signals, then the controller is used to control the working states of LED sensor light for auto-control effect. Yet, existing human infrared recipient processor will filter tiny electric signals output by PIR, and amplify them to the extent that can be identified by the logic level, so as to control the output circuit; as the analog signal is vulnerable to temperature change, and the circuit is complex, there are some shortcomings such as: lower SNR, reliability and sensitivity without complex logic control.

SUMMARY OF THE INVENTION

An object of the invention is to provide a human infrared recipient processor, which features simple construction, higher SNR, stability and sensitivity as well as strong logic functions and/or provide an alternative to existing technology.

The present invention adopts the following technology schemes: a human infrared recipient processor, which comprises an amplifying circuit, a switch control circuit for output of switching signals and a passive infrared radiation sensor (PIR) for obtaining analogue human IR signals; it also comprises a photosensitive tube (PHOT) for obtaining brightness signals, a main controller IC1 used for A/D conversion and digital filtering of analogue human IR signals and logical control/output of high-/low-level signals by the brightness and switching signals, as well as an external output circuit for controlling the working states depending on high-/low-level signals.

The PIR is connected with the input end of amplifying circuit, the output end of amplifying circuit is connected with the $7^{th}$ pin of the main controller IC1, the output end of switch control circuit is connected with the $4^{th}$ pin of the main controller IC1, the output end of photosensitive tube PHOT is connected with the $5^{th}$ pin of the main controller IC1, and the 2nd pin of the main controller IC1 is connected with the input end of the external output circuit.

The amplifying circuit may comprise a triode Q2, resistor R1, R3, R5 and capacitor C30; electrode D of the PIR is connected with electrode B of Q2 and one end of R1, the other end of R1 is connected with electrode E of Q2, which is connected with the power supply for PIR; electrode C of Q2 is connected with one end of R3; the other end of R3 is connected with electrode S of PIR and one end of R5, the anode of C30 is connected with electrode S of PIR, the other end of R5, the cathode of C30, and electrode G of PIR are grounded.

The Q2 may be a BC857, the resistance of R1 may be 2.2MΩ, that of R3 may be 220KΩ, and that of R5 may be 220KΩ; the capacitance of C30 may be 100 μF; PIR may be a RE200.

The human infrared recipient processor may also comprise a power circuit and a sampling circuit; of which the sampling circuit may comprise a resistor R7 and R8; the output end of power circuit is connected with one end of R7; the other end of R7 is connected with $6^{th}$ pin of the main controller IC1 and one end of R8; the other end of R8 is connected with $2^{nd}$ pin of photosensitive tube PHOT, and $1^{st}$ pin of photosensitive tube PHOT is connected with $5^{th}$ pin of the main controller IC1.

The human infrared recipient processor may also comprises a stabilizing and filtering circuit, which may comprise a voltage-stabilizing controller U1, capacitor C1, C27, C32, C33, and resistor R19, R22; of which, voltage-stabilizing controller U1 may be a HT7130, the output end of the power circuit is also connected with $2^{nd}$ pin of the voltage-stabilizing controller U1 and anode of C1, $3^{rd}$ pin of the voltage-stabilizing controller U1 is connected with $8^{th}$ pin of the main controller IC1, anode of C27 and one end of R19; the other end of R19 is connected with anode of C32 and one end of R22; the other end of R22 is connected with anode of C33 and electrode E of Q2; C1, C27, C32, C33 and $1^{st}$ pin of the voltage-stabilizing controller U1 are grounded, and $1^{st}$ pin of the main controller IC1 is grounded.

The photosensitive tube PHOT may be a L-32E0PTIC, the resistance of R7 may be 240KΩ, and that of R8 may be 220KΩ; the capacitance of C1, C27, C32 and C33 may be 100 mμF; the resistance of R19 may be 39KΩ, and that of R22 may be 3.3KΩ.

The voltage output by the $3^{rd}$ pin of the voltage-stabilizing controller U1 may be +2.5V.

The human infrared recipient processor may also comprise a low-voltage indicating circuit, which may comprise a LED2, R14, and C23; the $3^{rd}$ pin of the main controller IC1 is connected with cathode of LED2 and one end of C23; the anode of LED2 and the other end of C23 are connected with one end of R14; and the other end of R14 is connected with the $3^{rd}$ pin of the voltage-stabilizing controller U1.

The switch control circuit may comprise an interface J1, J2, and 8-pin switch SW1 with ON, OFF, and AUTO functions; the $7^{th}$ pin of SW1 is connected with the $4^{th}$ pin of the main controller IC1, the $2^{nd}$ pin of J1, J2; the $1^{st}$ pin of J2 is connected with the $3^{rd}$ pin of SW1, and the $1^{st}$ pin of J1 is connected with input end of the power circuit.

The external output circuit may also comprise a LED1, R12, Q1, C5, and R10; triode Q1 may be an APM2302AA, the $2^{nd}$ pin of the main controller IC1 is connected with electrode B of Q1 and one end of R10/C5, the other end of R10/C5 and electrode E of Q1 are grounded; electrode C of Q1 is connected with cathode of LED1, the anode of LED1 is connected with one end of R12, and the other end of R12 is connected with output end of the power circuit.

DETAILED DESCRIPTION OF THE INVENTION

Figure 1:
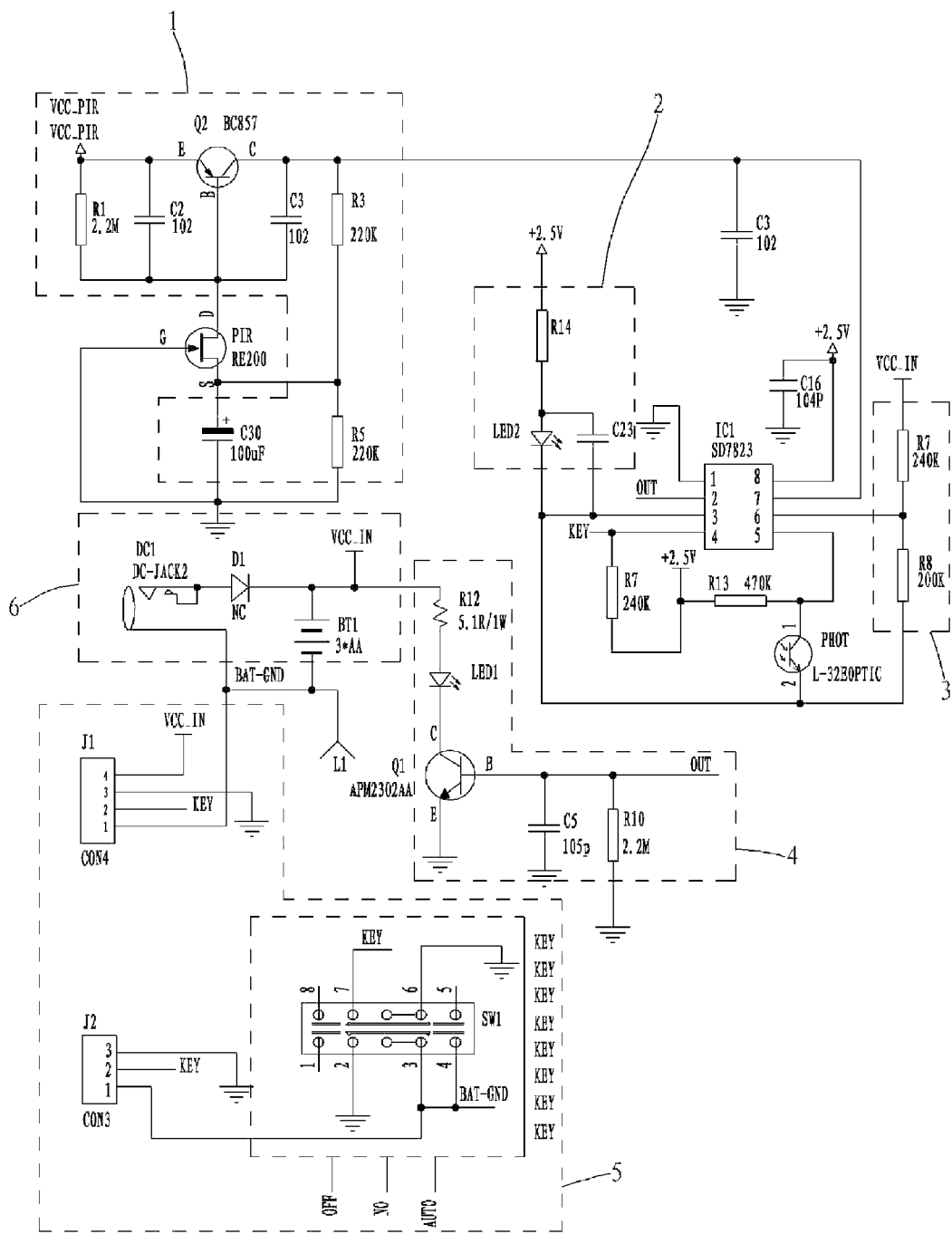
FIG. 1: a circuit diagram of the present invention.
Figure 2:
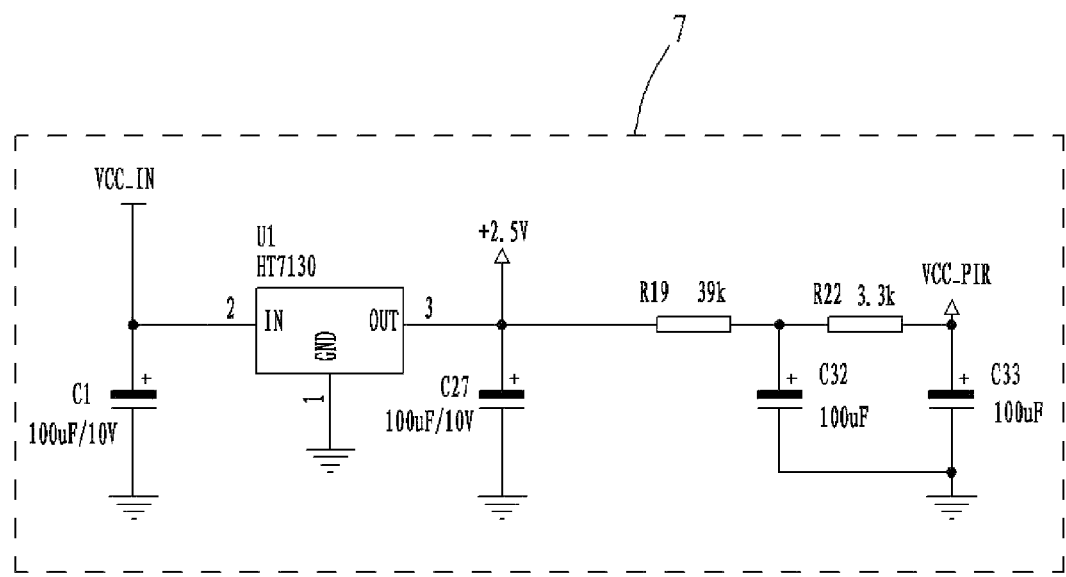
FIG. 2: a circuit diagram of the stabilizing and filtering circuit of the present invention.

The following is a detailed description of the present invention based on the attached drawings:

Referring to FIGS. 1 and 2 for a first preferred embodiment, the human infrared recipient processor comprises an amplifying circuit 1, a switch control circuit 5 for output of switching signals, and PIR for obtaining analogue human IR signals; it also comprises a photosensitive tube PHOT for obtaining brightness signals, a main controller IC1 used for A/D conversion and digital filtering of analogue human IR signals and logical control/output of high-/low-level signals by the brightness and switching signals, as well as an external output circuit 4 for controlling the working states depending on high-/low-level signals.

The operating principle of the human infrared recipient processor is that: PIR inputs analogue human IR signals of extremely low static current, then outputs tiny electric signals, which are subject to A/D conversion and digital filtering by the main controller IC1, then high-/low-level signals are output depending on the brightness and switching signals so as to control external output circuit 4. With introduction of digitalization, the human infrared recipient processor of high sensitivity is slightly affected by temperature; the filtering by software/hardware ensures stronger immunity from interference, and reduces the circuit process, so it presents simple circuit structure, higher SNR and reliability; the main controller IC1 could improve logic functions and reduce power consumption with introduction of optimized filtering and signal judgment algorithm.

PIR is connected with input end of the amplifying circuit 1, the output end of the amplifying circuit 1 is connected with the 7th pin of the main controller IC1, the output end of the switch control circuit 5 is connected with the $4^{th}$ pin of the main controller IC1, the output end of the photosensitive tube PHOT is connected with the $5^{th}$ pin of the main controller IC1, the $2^{nd}$ pin of the main controller IC1 is connected with input end of the external output circuit 4. The brightness signals are converted into electrical signals by PHOT and then input to the $5^{th}$ pin of the main controller IC1, and subject to subsequent operation after A/D conversion and digital filtering by IC1.

The amplifying circuit 1 consists of Q2, R1, R3, R5, and C30; electrode D of PIR is connected with electrode B of Q2 and one end of R1, the other end of R1 is connected with electrode E of Q2, which is then connected with the power supply for PIR; electrode C of Q2 is connected with one end of R3; the other end of R3 is connected with electrode S of PIR and one end of R5, the anode of C30 is connected with electrode S of PIR, the other end of R5, and the cathode of C30 and electrode G of PIR are grounded. IR signals sent by the human body are received by PIR and converted into electrical signals, then amplified by the amplifying circuit 1 consisting of Q2, R1, R3, R5, and C30, next input to the $7^{th}$ pin of the main controller IC1, and subject to subsequent operation after digital filtering by the main controller IC1.

As a preferred embodiment, the resistance of R1 is 2.2 MO, that of R3 is 220KΩ, that of R5 is 220KΩ, and the capacitance of C30 is 100 μF. The aforementioned parameters can be set, where applicable.

Furthermore, the human infrared recipient processor of the present invention also comprises: power circuit 6, sampling circuit 3, stabilizing and filtering circuit 7, and low-voltage indicating circuit 2. The sampling circuit 3 consists of R7 and R8, the output end of power circuit 6 is connected with one end of R7; the other end of R7 is connected with the $6^{th}$ pin of the main controller IC1 and one end of R8; the other end of R8 is connected with the $2^{nd}$ pin of PHOT, and the $1^{st}$ pin of PHOT is connected with the $5^{th}$ pin of the main controller IC1. The stabilizing and filtering circuit 7 consists of voltage-stabilizing controller U1, C1, C27, C32, C33, R19 and R22; of which the output end of the power circuit 6 is also connected with the $2^{nd}$ pin of the voltage-stabilizing controller U1 and the anode of C1; the $3^{rd}$ pin of the voltage-stabilizing controller U1 is connected with the $8^{th}$ pin of the main controller IC1, the anode of C27 and one end of R19; the other end of R19 is connected with the anode of C32 and one end of R22; the other end of R22 is connected with the anode of C33 and electrode E of Q2, C1, C27, C32, C33, and the $1^{st}$ pin of the voltage-stabilizing controller U1 are grounded, whilst the 1st pin of the main controller IC1 is grounded. The low-voltage indicating circuit 2 consists of LED2, R14, and C23; the $3^{rd}$ pin of the main controller IC1 is connected with cathode of LED2 and one end of C23; anode of LED2 and the other end of C23 are connected with one end of R14; and the other end of R14 is connected with the $3^{rd}$ pin of the voltage-stabilizing controller U1.

Voltage-stabilizing controller U1 is used to stabilize the input voltage of $8^{th}$ pin of the main controller IC1 (i.e.: voltage output by $3^{rd}$ pin of the voltage-stabilizing controller U1), e.g.: 2.5V; of which C1 and C27 match the voltage-stabilizing controller U1, R19, R22, C32 and C33 constitute a power filter network of PIR; of which, the sampling circuit 3 transmits the power voltage to $6^{th}$ pin of the main controller IC1, when the sampling circuit 3 detects extremely low working voltage of voltage-stabilizing controller U1, LED2 of low-voltage indicating circuit 2 is highlighted, reminding the users of replacing the power supply. In the present invention, the power circuit 6 is composed of rechargeable batteries.

As a preferred embodiment, the resistance of R7 is 240KΩ, that of R8 is 220KΩ, the capacitance of C1, C27, C32 and C33 is 100 μF, the resistance of R19 is 39KΩ, and that of R22 is 3.3KΩ; the aforementioned parameters can be set, where applicable.

As a preferred embodiment, the switch control circuit 5 consists of interface J1, J2, and 8-pin switch SW1 with ON, OFF, and AUTO functions; the $7^{th}$ pin of SW1 is connected with the 4th pin of the main controller IC1, 2nd pin of J1, J2; the $1^{st}$ pin of J2 is connected with the $3^{rd}$ pin of SW1, the $1^{st}$ pin of J1 is connected with input end of the power circuit 6. The switch control circuit 5 outputs high-/low-level signals to the $4^{th}$ pin of the main controller IC1, so as to control the working states of entire circuit, including: ON, OFF, and AUTO.

The human infrared recipient processor of the present invention is applied to LED sensor light; as a preferred embodiment, the external output circuit 4 consists of LED1, R12, Q1, C5 and R10; the $2^{nd}$ pin of the main controller IC1 is connected with electrode B of Q1, one end of R10/C5, the other end of R10/C5 and electrode E of Q1 are grounded; electrode C of Q1 is connected with the cathode of LED1, and the anode of LED1 is connected with one end of R12; the other end of R12 is connected with output end of the power circuit 6. The external output circuit 4 forms an LED control circuit; in such case, the $2^{nd}$ pin of the main controller IC1 outputs high-/low-level signals to electrode B of Q1 and control the switching of Q1, thereby controlling the on/off state of LED 1. In addition to the circuit structure in aforementioned preferred embodiment, the external output circuit 4 can be designed where necessary.

The difference of between a second preferred embodiment compared with the first preferred embodiment lies in that, the external output circuit 4 of the human infrared recipient processor is an alarm driving circuit that can be designed, where necessary, for the alarming purpose.

The difference of between a third preferred embodiment compared with the first preferred embodiment lies in that, the external output circuit 4 of the human infrared recipient processor is a temperature measurement driving circuit that can be designed, where necessary, for the temperature measurement purpose. Moreover, said the human infrared recipient processor of the present invention can also be applied to other fields, where the external output circuit 4 can be designed accordingly.

The human infrared recipient processor of the present invention comprises a PHOT for obtaining brightness signals, a main controller IC1 used for A/D conversion and digital filtering of analogue human IR signals and logical control/output of high-/low-level signals by the brightness and switching signals, as well as an external output circuit for controlling the working states depending on high-/low-level signals; controlling the working states depending on high-/low-level signals; the PIR is connected with input end of the amplifying circuit, the output end of the amplifying circuit is connected with the $7^{th}$ pin of the main controller IC1, the output end of the switch control circuit is connected with the $4^{th}$ pin of the main controller IC1, the output end of PHOT is connected with the $5^{th}$ pin of the main controller IC1, and the $2^{nd}$ pin of the main controller IC1 is connected with the input end of the external output circuit. As for the human infrared recipient processor, PIR outputs tiny electric signals, which are subject to A/D conversion and digital filtering by the main controller IC1, then high-/low-level signals are controlled logically and output depending on the brightness and switching signals, so as to control external output circuit and reduce the circuit process; thus it presents simple circuit structure, higher SNR, stability and sensitivity as well as stronger logic functions.

The above is a detailed description of the present invention based on typical preferred embodiments. However, it should be appreciated that the present invention is capable of a variety of embodiments and various modifications by those skilled in the art, and all such equivalent variations or changes shall be embraced within the scope of the following claims.

What is claimed is:
1. A human infrared recipient processor comprising:
   an amplifying circuit;
   a switch control circuit for output of switching signals;
   a passive infrared radiation sensor (PIR) for obtaining analogue human IR signals;
   a photosensitive tube (PHOT) for obtaining brightness signals;
   a power circuit
   a sampling circuit consisting of resistor R7 and resistor R8; and
   a main controller IC1 used for A/D conversion and digital filtering of the analogue human IR signals and logical control/output of high-/low-level signals depending on the brightness and switching signals, as well as an external output circuit for controlling the working states of an external device depending on the high-/low-level signals;
   wherein the main controller IC1 comprises a plurality of pins;
   wherein the PIR is connected with the input end of the amplifying circuit;
   wherein the output end of the amplifying circuit is connected with a $7^{th}$ pin of the main controller IC1, the output end of the switch control circuit is connected with a $4^{th}$ pin of the main controller IC1, the output end of PHOT is connected with a $5^{th}$ pin of the main controller ICI, and a $2^{nd}$ pin of the main controller IC1 is connected with the input end of the external output circuit;
   wherein the PHOT comprises a plurality of pins;
   wherein the output end of power circuit is connected with one end of R7;
   wherein the other end of resistor R7 is connected with a $6^{th}$ pin of the main controller IC1 and one end of resistor R8; and
   wherein the other end of resistor R8 is connected with a $2^{nd}$ pin of the PHOT, and a $1^{st}$ pin of the PHOT is connected with a $5^{th}$ pin of the main controller IC1.

2. The human infrared recipient processor as claimed in claim 1, wherein the amplifying circuit consists of triode Q2, resistor R1, R3, R5, and capacitor C30;
   wherein an electrode D of the PIR is connected with an electrode B of triode Q2 and one end of resistor R1, the other end of resistor R1 is connected with an electrode E of triode Q2, which is connected with the power supply for the PIR;
   wherein an electrode C of triode Q2 is connected with one end of resistor R3;
   wherein an the other end of resistor R3 is connected with an electrode S of the PIR and one end of resistor R5, the anode of capacitor C30 is connected with electrode S of the PIR, and the other end of resistor R5, the cathode of capacitor C30, and an electrode G of the PIR are grounded.

3. The human infrared recipient processor as claimed in claim 2, wherein the resistance of resistor R1 is 2.2 MΩ, the resistance of resistor R3 is 220KΩ, and the resistance of resistor R5 is 220KΩ, and the capacitance of capacitor C30 is 100 μF.

4. The human infrared recipient processor as claimed in claim 1, further comprising:
   a stabilizing and filtering circuit, comprising a voltage-stabilizing controller U1, capacitor C1, capacitor C27, capacitor C32, capacitor C33, resistor R19, and resistor R22;
   wherein the output end of the power circuit is also connected with a $2^{nd}$ pin of the voltage-stabilizing controller U1 and the anode of capacitor C1, a $3^{rd}$ pin of the voltage-stabilizing controller U1 is connected with an $8^{th}$ pin of the main controller IC1, the anode of capacitor C27, and one end of resistor R19;
   wherein the other end of resistor R19 is connected with the anode of capacitor C32 and one end of resistor R22;
   wherein the other end of resistor R22 is connected with the anode of capacitor C33 and an electrode E of Q2;
   wherein capacitor C1, capacitor C27, capacitor C32, capacitor C33, and a $1^{st}$ pin of the voltage-stabilizing controller U1 are grounded, and the $1^{st}$ pin of the main controller IC1 is grounded.

5. The human infrared recipient processor as claimed in claim 4, wherein the voltage output by a $3^{rd}$ pin of the voltage-stabilizing controller U1 is +2.5V.

6. The human infrared recipient processor as claimed in claim 4, further comprising a low-voltage indicating circuit, consisting of a light emitting diode LED2, resistor R14, and capacitor C23;
   wherein the $3^{rd}$ pin of the main controller IC1 is connected with the cathode of light emitting diode LED2 and one end of capacitor C23;
   wherein the anode of light emitting diode LED2 and the other end of capacitor C23 are connected with one end of resistor R14;
   wherein the other end of resistor R14 is connected with the $3^{rd}$ pin of the voltage-stabilizing controller U1.

7. The human infrared recipient processor as claimed in claim 1, wherein the switch control circuit consists of interface J1, interface J2, and an 8-pin switch SW1 with ON, OFF, and AUTO functions;
  wherein a $7^{th}$ pin of switch SW1 is connected with the $4^{th}$ pin of the main controller IC1, a $2^{nd}$ pin of interface J1, and a $2^{nd}$ pin of interface J2;
  wherein a $1^{st}$ pin of interface J2 is connected with a $3^{rd}$ pin of switch SW1, and a $1^{st}$ pin of interface J1 is connected with input end of the power circuit.

8. The human infrared recipient processor as claimed in claim 1, wherein the external output circuit consists of a light emitting diode (LED1), resistor R12, triode Q1, capacitor C5, and resistor R10;
  wherein a $2^{nd}$ pin of the main controller ICI is connected with electrode B of triode Q1, one end of resistor R10, and one end of capacitor C5;
  wherein the other end of resistor R10, the other end of capacitor C5, and electrode E of triode Q1 are grounded;
  wherein electrode C of triode Q1 is connected with the cathode of light emitting diode LED1, the anode of light emitting diode LEDI is connected with one end of resistor R12, and the other end of resistor R12 is connected with the output end of the power circuit.

9. A human infrared recipient processor, comprising:
  a main controller IC1 used for A/D conversion, digital filtering of analogue human IR signals, and logical control/output of high-/low-level signals depending on the brightness and switching signals, wherein the main controller IC1 comprises a plurality of pins, and a 1st pin of the pins is grounded;
  a power circuit;
  a stabilizing and filtering circuit comprising a voltage-stabilizing controller U1 with a plurality of pins, capacitors C1, C27, C32, and C33, each with capacitance of 100 μF respectively, resistor R19 with resistance of 39KΩ, and resistor R22 with resistance of 3.3KΩ, wherein capacitor C1, capacitor C27, capacitor C32, capacitor C33, and a $1^{st}$ pin of the voltage-stabilizing controller U1 are grounded;
  a sampling circuit consisting of resistor R7 with resistance of 240KΩ and resistor R8 with resistance of 220KΩ, wherein the resistor R7 has one end connected with the output end of the power circuit and the other end connected with a $6^{th}$ pin of the main controller IC1 and one end of the resistor R8;
  an amplifying circuit, wherein the output end of the amplifying circuit is connected with a $7^{th}$ pin of the main controller IC1;
  a switch control circuit for output of switching signals, wherein the output end of the switch control circuit is connected with a $4^{th}$ pin of the main controller IC1;
  a passive infrared radiation sensor (PIR) for obtaining analogue human IR signals, wherein the PIR is connected with the input end of the amplifying circuit;
  a photosensitive tube (PHOT) for obtaining brightness signals, the PHOT comprising a plurality of pins, wherein the PHOT comprising a plurality of pins has a $1^{st}$ pin connected with a $5^{th}$ pin of the main controller IC1 and a $2^{nd}$ pin connected with the other end of the resistor R8; and
  an external output circuit for controlling the working states of an external device depending on the high-/low-level signals, wherein the input end of the external output circuit is connected with a 2nd pin of the main controller IC1;
  wherein a 2nd pin of the voltage-stabilizing controller U1 and anode of the capacitor C1 are connected with the output end of the power circuit respectively;
  wherein a 3rd pin of the voltage-stabilizing controller U1 is connected with an $8^{th}$ pin of the main controller IC1, anode of capacitor C27, and one end of resistor R19;
  wherein the other end of resistor R19 is connected with anode of C32 and one end of resistor R22; and
  wherein the other end of resistor R22 is connected with anode of capacitor C33.

10. The human infrared recipient processor as claimed in claim 9, wherein a voltage output by the $3^{rd}$ pin of the voltage-stabilizing controller U1 is +2.5 volts.

11. The human infrared recipient processor as claimed in claim 10, further comprising a low-voltage indicating circuit consisting of a light emitting diode LED2, resistor R14, and capacitor C23;
  wherein the $3^{rd}$ pin of the main controller IC1 is connected with cathode of light emitting diode LED2 and one end of capacitor C23;
  wherein the anode of light emitting diode LED2 and the other end of capacitor C23 are connected with one end of resistor R14; and
  the other end of resistor R14 is connected with the $3^{rd}$ pin of the voltage-stabilizing controller U1.

12. The human infrared recipient processor as claimed in claim 9, wherein the switch control circuit consists of interface J1 and interface J2, each having a plurality of pins, and 8-pin switch SW1 with ON, OFF, and AUTO functions;
  wherein a $7^{th}$ pin of switch SW1 is connected with the $4^{th}$ pin of the main controller IC1 and, a $2^{nd}$ pin of interface J1 and a $2^{nd}$ pin of interface J2;
  wherein a $1^{st}$ pin of interface J2 is connected with the $3^{rd}$ pin of switch SW1, and a $1^{st}$ pin of interface J1 is connected with input end of the power circuit.

13. The human infrared recipient processor as claimed in claim 9, wherein the external output circuit also consists of light emitting diode LED1, resistor R12, triode Q1, capacitor C5, and resistor R10;
  wherein the $2^{nd}$ pin of the main controller IC1 is connected with electrode B of triode Q1, one end of resistor R10, and one end of capacitor C5;
  wherein the other end of resistor R10, the other end of capacitor C5, and electrode E of triode Q1 are grounded;
  wherein electrode C of triode Q1 is connected with the cathode of light emitting diode LED1, the anode of light emitting diode LED1 is connected with one end of resistor R12, and the other end of resistor R12 is connected with the output end of the power circuit.

* * * * *